United States Patent [19]
Kawabe et al.

[11] Patent Number: 5,807,454
[45] Date of Patent: Sep. 15, 1998

[54] METHOD OF MAUFACTURING A LEADING EDGE STRUCTURE FOR AIRCRAFT

[75] Inventors: Shun Kawabe; Keiichi Sato; Daiya Yamashita; Haruo Nakayama; Koji Shiraishi; Keizo Matsumoto, all of Saitama, Japan

[73] Assignee: Honda Giken Kogyo Kabushiki Kaisha, Tokyo, Japan

[21] Appl. No.: 711,678

[22] Filed: Sep. 4, 1996

[30] Foreign Application Priority Data

Sep. 5, 1995 [JP] Japan ................................... 7-228222
Sep. 5, 1995 [JP] Japan ................................... 7-228264

[51] Int. Cl.$^6$ ............................ B64D 15/04; B32B 31/00
[52] U.S. Cl. ...................... 156/214; 60/39.093; 156/245; 156/289; 156/292; 244/134 B
[58] Field of Search ..................... 244/134 B; 60/39.093; 156/245, 214, 242, 292, 289

[56] References Cited

U.S. PATENT DOCUMENTS

| | | |
|---|---|---|
| H648 | 7/1989 | Tran . |
| 4,738,416 | 4/1988 | Birbragher . |
| 5,011,098 | 4/1991 | McLaren et al. . |
| 5,228,643 | 7/1993 | Manda et al. ........................ 244/134 B |
| 5,288,355 | 2/1994 | Leffel et al. ........................ 156/245 X |
| 5,356,096 | 10/1994 | Rauckhorst, III et al. ......... 244/134 A |

FOREIGN PATENT DOCUMENTS 6194898  5/1986  Japan .

Primary Examiner—Jeff H. Aftergut
Attorney, Agent, or Firm—Lyon & Lyon LLP

[57] ABSTRACT

A leading edge structure for an aircraft has an outer wall, an inner wall disposed within the outer wall and including a partition with, the outer wall, the inner wall and the partition jointly defining a hot-air chamber, and a plurality of flow-rectifying fins or disposed in the hot-air chamber and compartmentalizing the hot-air chamber into a plurality of hot-air passages. The outer wall and the flow-rectifying fins are made of a fiber-reinforced synthetic resin and joined to each other by curing. The inner wall and the partition comprise a single component which is made of a fiber-reinforced synthetic resin, and being bonded to the outer wall. Alternatively, the inner wall and the partition are separate from each other and are joined to each other.

7 Claims, 9 Drawing Sheets

METHOD OF MAUFACTURING A LEADING EDGE STRUCTURE FOR AIRCRAFT

BACKGROUND OF THE INVENTION

1. Field of the Invention

The present invention relates to a leading edge structure made of a fiber-reinforced synthetic resin for use as an anti-icing leading edge structure of a main wing, a tailplane, an engine cowl inlet or the like of an aircraft, and a method of manufacturing such an anti-icing leading edge structure.

2. Description of the Prior Art

Leading edges of a main wing, a tailplane, an engine cowl inlet, and horn balance tip ends of an elevator and a rudder, etc., of an aircraft incorporate an anti-icing structure for introducing high-temperature bleed air from an engine compressor or the like into an inner chamber in the leading edges. Such leading edge structures are disclosed in U.S. Pat. No. 5,011,098, U.S. Reg. No.: H648, U.S. Pat. No. 4,738,416, and Japanese laid-open patent publication No. 61-94898.

The leading edge structure disclosed in U.S. Pat. No. 5,011,098 includes a hot-air chamber defined behind an outer wall by an inner wall and a partition which are attached to the outer wall. The hot-air chamber is divided into a hot-air ejector surrounded mainly by the outer wall and the partition and a hot-air passage surrounded by the outer wall and the inner wall. The inner wall has an irregular cross-sectional shape which provides a plurality of flow-rectifying walls or convexities that compartmentalize the hot-air passage into a plurality of hot-air passageways or recesses.

The leading edge structure disclosed in U.S. Reg. No.: H648 is concerned with a leading edge structure for an engine cowl inlet which has a flange component to which a partition is coupled, the flange component being disposed in and connected to an outer wall. The flange component has a corrugated portion serving as a hot-air passage.

Each of the leading edge structures disclosed in U.S. Pat. No. 4,738,416, and Japanese laid-open patent publication No. 61-94898 has a hot-air chamber defined within the leading edge of an outer wall. Hot air introduce into the hot-air chamber is caused to flow along the reverse side of the outer wall.

In the above conventional anti-icing structures for leading edges, if the outer wall, the inner wall, and the partition are made of a metallic material such as an aluminum alloy or the like, then fasteners such as rivets are used to fix the inner wall and the partition to the reverse side of the outer wall to define the hot-air chamber. Those fasteners have ends exposed on the outer surface of the outer wall, presenting a resistance to the air flowing along the outer surface of the leading edge. It is desirable to reduce such a resistance to the air flow for improving aerodynamic characteristics of the leading edge.

It is also desirable to reduce the weight of the leading edge structure because the fasteners such as rivets or the like cause an increase in the weight of the leading edge structure.

The leading edge structure should preferably be of an increased thermal strength because a thermal deformation of the outer wall caused by high-temperature hot air flowing in the anti-icing structure would disturb an air flow along the leading edge.

It is also preferable to eliminate holes for inserting the fasteners for thereby increase the crack resistance and corrosion resistance of the leading edge structure.

If a leading edge structure is made of a fiber-reinforced synthetic resin, then fasteners will not be exposed on the surface of an outer wall, the resistance of the leading edge structure to an air flow will be reduced, and the leading edge structure will be of an increased thermal resistance because the fiber-reinforced synthetic resin has a small coefficient of thermal expansion (e.g., the coefficient of thermal expansion of an aluminum alloy is 23 whereas the coefficient of thermal expansion of CRFP ranges from 3 to 5). However, the conventional process of separately molding outer and inner walls of a fiber-reinforced synthetic resin and subsequently bonding them to each other with an adhesive has been disadvantageous in that the process requires separate molds for molding the outer and inner walls, respectively, and is costly and highly laborious and time-consuming.

Portions of the outer and inner walls and the partition may be sealed, rather than being bonded, to each other with a sealant. However, the sealing process is also highly laborious and time-consuming, and the use of the sealant results in an increase in the weight of the entire assembly. If a gap is created between the partition and the inner wall, then hot air tends to leak through the gap, impairing the anti-icing capability of the leading edge structure.

Therefore, there has been a demand for an anti-icing leading edge structure of a fiber-reinforced synthetic resin for an aircraft, which includes an outer wall, an inner wall, and a partition that are securely joined together, can be formed with ease, and is inexpensive to manufacture.

SUMMARY OF THE INVENTION

It is therefore an object of the present invention to provide an anti-icing leading edge structure for an aircraft which can be formed of a fiber-reinforced synthetic resin easily and inexpensively and includes an outer wall, an inner wall, and a partition that are securely and hermetically joined together.

To achieve the above object, there is provided in accordance with the present invention a leading edge structure for an aircraft, comprising an outer wall, an inner wall disposed in the outer wall and including a partition, the outer wall, the inner wall, and the partition jointly defining a hot-air chamber, and a plurality of flow-rectifying walls disposed in the hot-air chamber and compartmentalizing the hot-air chamber into a plurality of hot-air passages, the outer wall and the flow-rectifying walls being made of a fiber-reinforced synthetic resin and joined to each other by curing, the inner wall and the partition comprising a single component which is made of a fiber-reinforced synthetic resin, and being bonded to the outer wall.

Since the outer wall and the flow-rectifying walls are joined to each other by curing and the inner wall and the partition are formed as a single component by one mold, no separate joining step is required, and the strength of the entire leading edge structure is high. The inner wall and the partition which are formed as a single component are hermetically sealed with respect to each other, preventing hot air from leaking therebetween.

According to the present invention, there is also provided a method of manufacturing a leading edge structure for an aircraft having an outer wall, an inner wall disposed in the outer wall and including a partition, the outer wall, the inner wall, and the partition jointly defining a hot-air chamber, and a plurality of flow-rectifying walls disposed in the hot-air chamber and compartmenting the hot-air chamber into a plurality of hot-air passages, the method comprising the steps of positioning a laminated body of an uncured fiber-reinforced synthetic resin on a tool die which is complementary in shape to a leading edge of an aircraft, positioning a plurality of shape retainers and a plurality of flow-rectifying fin or wall members of an uncured fiber-reinforced synthetic resin having an L-shaped cross section at respective ends of the shape retainers, on an inner surface of the laminated body, covering the shape retainers and the flow-rectifying walls with a vacuum bag, and evacuating the vacuum bag, curing the laminated body into the outer wall and the flow-rectifying fin members into the flow-rectifying walls with heat and pressure to join ends of the flow-rectifying fins to the outer wall, removing the shape retainers to form the hot-air passages, and holding an inner wall and a partition which have been made as a single component of a fiber-reinforced synthetic resin, against other ends of the flow-rectifying fins, and bonding the inner wall and the partition to the outer wall.

The shape retainers preferably are made of silicone rubber. The silicone rubber is a polymer having a main chain composed of repeated siloxane bonds (Si—o) and a side chain of alkyl and aryl groups, and is an elastomeric material which is highly resistant to heat and can be released well from the laminated body which is cured. Since the silicone rubber has its transverse direction reduced when pulled, it can easily be pulled from the cured laminated body even without gradients on its surface.

According to the present invention, there is further provided a leading edge structure for an aircraft, comprising an outer wall, an inner wall disposed in the outer wall, a partition joined to the inner wall, the outer wall, the inner wall, and the partition jointly defining a hot-air chamber, and a plurality of flow-rectifying fins disposed in the hot-air chamber and compartmentalizing the hot-air chamber into a plurality of hot-air passages, the outer wall and the inner wall being made of a fiber-reinforced synthetic resin and joined to each other by curing.

Inasmuch as the outer wall and the inner wall are made of a fiber-reinforced synthetic resin and joined to each other by curing, the contacting surfaces of the outer and inner walls are firmly joined to each other under resin integrally-joined process, and are highly reliable. Because the double-walled structure of the outer and inner walls is kept hermetic even without a sealant, the leading edge structure does not suffer an increase in the weight which would otherwise be caused by use of a sealant.

According to the present invention, there is also provided a method of manufacturing a leading edge structure for an aircraft having an outer wall, an inner wall disposed in the outer wall, a partition joined to the inner wall, the outer wall, the inner wall, and the partition jointly defining a hot-air chamber, and a plurality of flow-rectifying fins or walls disposed in the hot-air chamber and compartmentalizing the hot-air chamber into a plurality of hot-air passages, the method comprising the steps of positioning a first laminated body of an uncured fiber-reinforced synthetic resin on a tool die which is complementary in shape to a leading edge of an aircraft, positioning a comb-toothed shape retainer on an inner surface of the first laminated body, positioning a second laminated body of an uncured fiber-reinforced synthetic resin on the comb-toothed shape retainer, inserting a portion of the second laminated body into tooth grooves of the comb-toothed shape retainer for forming the flow-rectifying walls, covering the second laminated body with a vacuum bag, and evacuating the vacuum bag, curing the first laminated body into the outer wall and the second laminated body into the inner wall with heat and pressure to join the first laminated body and the second laminated body to each other through the flow-rectifying walls, removing the shape retainer to form the hot-air passages, and joining the partition to a flat portion of the second laminated body which has been formed by a tooth-free portion of the shape retainer.

A portion of the second laminated body is inserted into the tooth grooves of the shape retainer which is sandwiched intermediate between the first laminated body and the second laminated body, forming the flow-rectifying fins or walls. When the vacuum bag is evacuated, tip ends of the flow-rectifying fins are brought into contact with the first laminated body. Then, the flow-rectifying fins and the outer wall (first laminated body) are cured and joined to each other with heat and pressure. Thereafter, the partition is joined to the flat portion of the inner wall (second laminated body) which has been formed by the tooth-free portion of the shape retainer, forming the hot-air chamber. The joined portion of the partition is not required to be irregular in shape for making the hot-air chamber hermetic, but may simply be flat. Therefore, the partition can easily be formed to shape.

The comb-toothed shape retainer is composed of the toothed portion and the tooth-free portion which is separate from the toothed portion. With this arrangement, after the first and second laminated bodies are cured, the shape retainer can be pulled out while keeping itself in its original shape, and hence can subsequently be used a number of times.

According to the present invention, there is further provided a method of manufacturing a leading edge structure for an aircraft having an outer wall, an inner wall disposed in the outer wall, a partition joined to the inner wall, the outer wall, the inner wall, and the partition jointly defining a hot-air chamber, and a plurality of flow-rectifying fins or walls disposed in the hot-air chamber and compartmentalizing the hot-air chamber into a plurality of hot-air passages, the method comprising the steps of positioning a first laminated body of an uncured fiber-reinforced synthetic resin on a tool die which is complementary in shape to a leading edge of an aircraft, positioning a plurality of comb-toothed shape retainers on an inner surface of the first laminated body, positioning a plurality of flow-rectifying walls of an uncured fiber-reinforced synthetic resin having a channel-shaped cross section which are fitted over ends of the respective shape retainers, positioning a second laminated body of an uncured fiber-reinforced synthetic resin on the comb-toothed shape retainers, covering the second laminated body with a vacuum bag, and evacuating the vacuum bag, curing the first laminated body into the outer wall and the second laminated body into the inner wall with heat and pressure to join the first laminated body and the second laminated body to each other through the flow-rectifying walls, removing the shape retainers to form the hot-air passages, and joining the partition to the second laminated body.

The shape retainers with the flow-rectifying walls fitted over their ends are sandwiched between the first and second laminated bodies. When the vacuum bag is evacuated, the flow-rectifying walls and the first and second laminated bodies are brought into intimate contact with each other. When the first and second laminated bodies are cured with heat and pressure, they are cured into the outer and inner walls, respectively, which are integrally joined to each other through the flow-rectifying walls.

The shape retainers are made of silicone rubber.

The fiber-reinforced synthetic resin comprises carbon fibers impregnated with a modified bismaleimide resin.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

The leading edge of a main wing or the like of an aircraft incorporates an anti-icing structure for preventing the leading edge from being iced. The anti-icing structure introduces high-temperature bleed air from an engine compressor or the like into an inner space defined in the leading edge and surrounded by an outer wall, and causes the bleed air to flow along the reverse side of the outer wall to increase the temperature of the surface of the outer wall for thereby preventing the surface of the leading edge from being iced.

Figure 1:
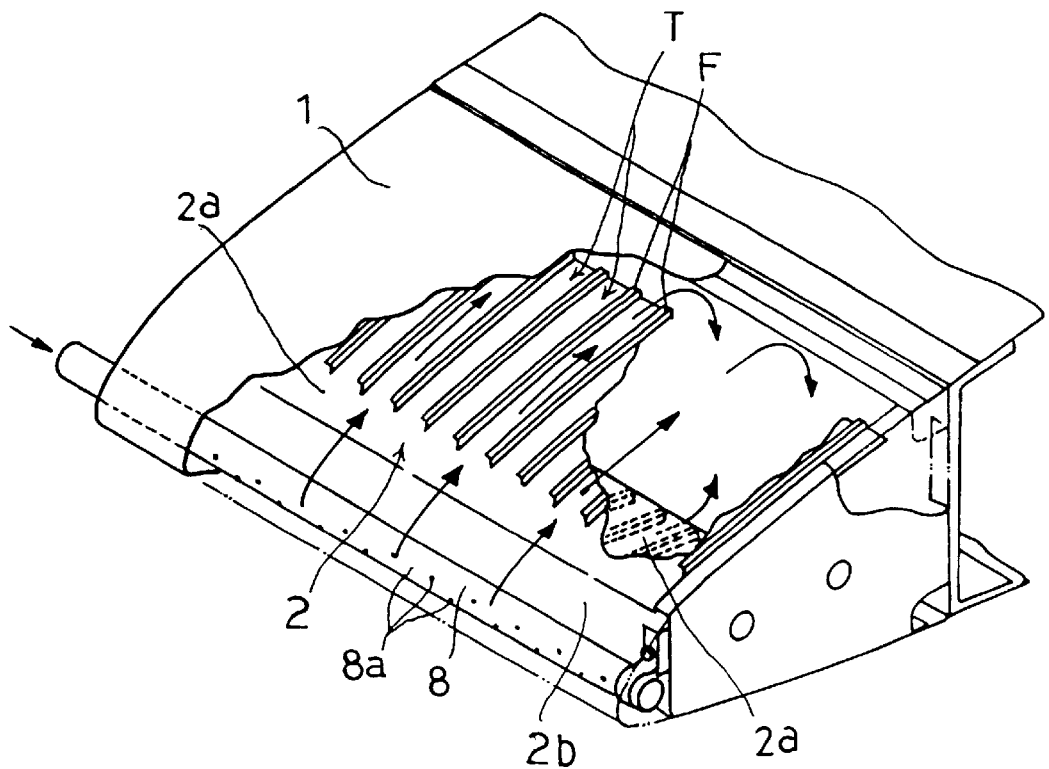
FIG. 1 is a fragmentary perspective view, partly broken away, of a leading edge structure for an aircraft according to a first embodiment of the present invention.
Figure 2:
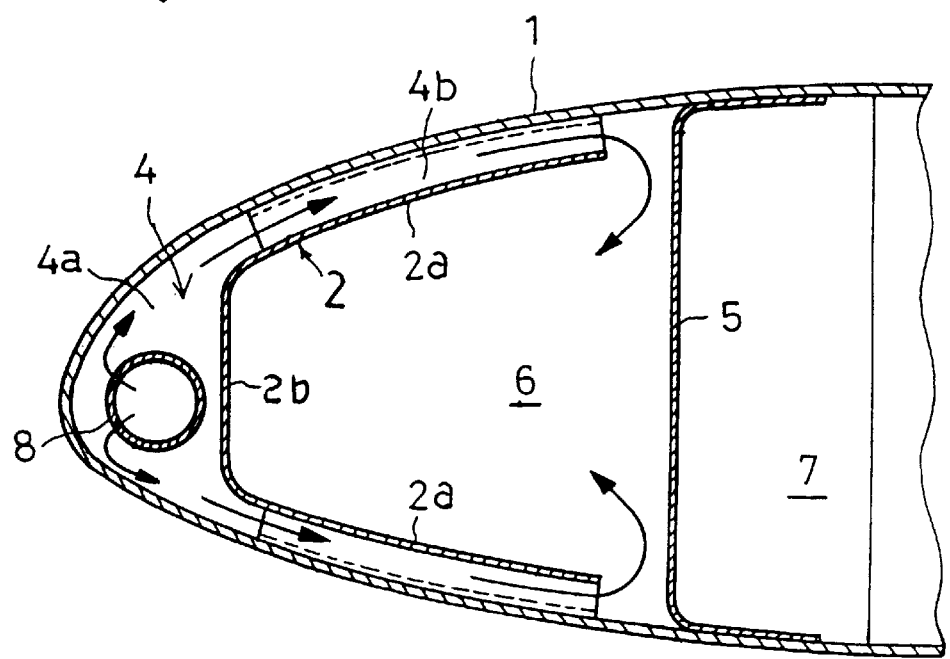
FIG. 2 is a cross-sectional view of the leading edge structure shown in FIG. 1.

In a leading edge structure for an aircraft according to a first embodiment of the present invention, a leading edge of a main wing of an aircraft is made of a fiber-reinforced synthetic resin which comprises a composite material of a modified bismaleimide resin and carbon fibers. As shown in FIGS. 1 and 2, the leading edge structure comprises an outer wall 1 made of the fiber-reinforced synthetic resin and an inner wall 2 made of the fiber-reinforced synthetic resin which is disposed within the outer wall 1 near the leading edge thereof. The outer wall 1 and the inner wall 2 jointly define a hot-air chamber 4 therebetween. The inner wall 2 comprises a pair of upper and lower inner wall panels 2a extending along respective upper and lower portions of the outer wall 1 and a partition 2b extending vertically between front ends of the inner wall panels 2a. The leading edge structure also includes a rear partition 5 disposed behind the inner wall 2. The rear partition 5 and the inner wall 2 jointly define a hot-air discharge chamber 6 therebetween. A temperature buffer chamber 7 is defined behind the rear partition 5. External air is introduced into the temperature buffer chamber 7 to prevent an integral tank, etc. housed in a rear portion of the main wing from being excessively heated.

As shown in FIG. 2, the hot-air chamber 4 is divided into a front hot-air ejector 4a positioned forwardly of the partition 2b and a hot-air passage 4b positioned rearwardly of the partition 2b. The hot-air ejector 4a accommodates therein a piccolo tube 8 for passing bleed air therethrough, the piccolo tube 8 having a number of air ejection holes 8a (see FIG. 1). A plurality of flow-rectifying fins F of L-shaped cross section are integrally joined to the outer wall 1 and positioned within the hot-air passage 4b at predetermined spaced intervals in the longitudinal direction of the main wing. The flow-rectifying fins F compartmentalize the hot-air passage 4b into a plurality of hot-air passageways T.

High-temperature bleed air ejected from the air ejection holes 8a of the piccolo tube 8 flows from the hot-air ejector 4a into the hot-air passageways T of the hot-air passage 4b, and then enters the hot-air discharge chamber 6 from which it is discharged into the atmosphere through discharge ports at wing ends. The high-temperature bleed air thus flowing along the inner surface of the outer wall 1 prevents the outer front surface of the main wing from being iced.

A process of manufacturing the leading edge structure described above will be described below with reference to FIGS. 3(A), 3(B), and 3(C).

Figure 3A:
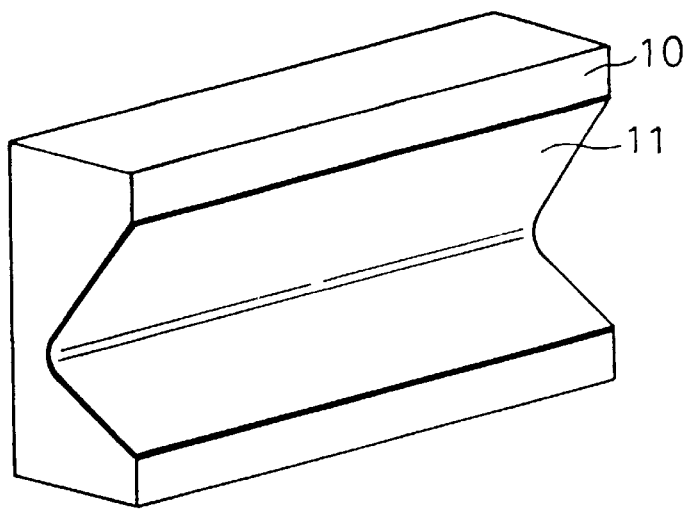
FIGS. 3(A), 3(B), and 3(C) are perspective views illustrative of a process of manufacturing the leading edge structure shown in FIG. 1.

First, as shown in FIG. 3(A), an outer skin prepreg 11 in the form of a laminated sheet of a composite intermediate material comprising carbon fibers impregnated with a modified bismaleimide resin is positioned in an outer skin tool die 10 which is complementary in shape to the leading edge of a main wing. The outer skin prepreg 11 is of a predetermined size, sticky, pliable, and flexible. When the outer skin prepreg 11 is pressed against the outer skin tool die 10, the outer skin prepreg 11 sticks to the die surface of the outer skin tool die 10 and is shaped complementarily to the die surface of the outer skin tool die 10.

Figure 3B:
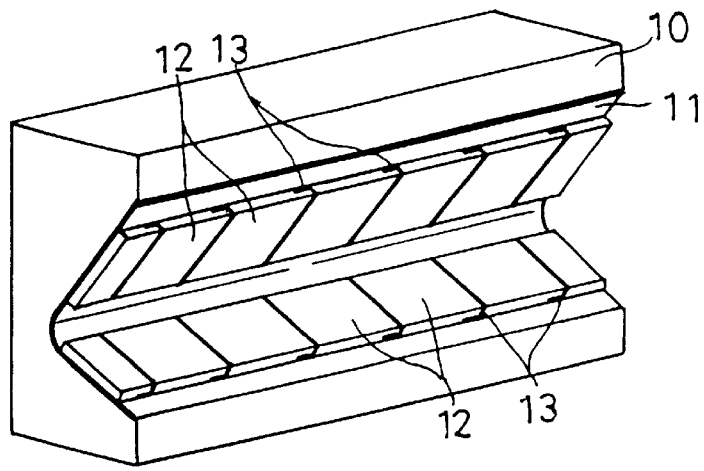
Figure 4:
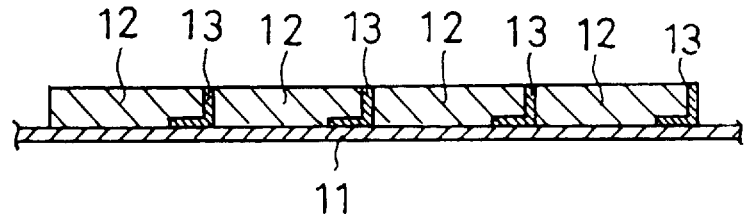
FIG. 4 is a cross-sectional view of an array of silicone blocks and flow-rectifying fin prepregs in the manufacturing process.

Then, as shown in FIG. 3(B), a plurality of rectangular silicone blocks 12 serving as shape retainers and a plurality of flow-rectifying fin prepregs 13 of L-shaped cross section are successively positioned on upper and lower slanted surfaces of the outer skin prepreg 11. At this time, as shown in FIG. 4, the flow-rectifying fin prepregs 13 of L-shaped cross section are positioned to cover respective corners of the rectangular silicone blocks 12. The rectangular silicone blocks 12 with the flow-rectifying fin prepregs 13 positioned on the respective corners thereof are intimately arranged in the longitudinal direction of the outer skin prepreg 11, with the flow-rectifying fin prepregs 13 having respective inner surfaces held against the inner surface of the outer skin prepreg 11.

Figure 3C:
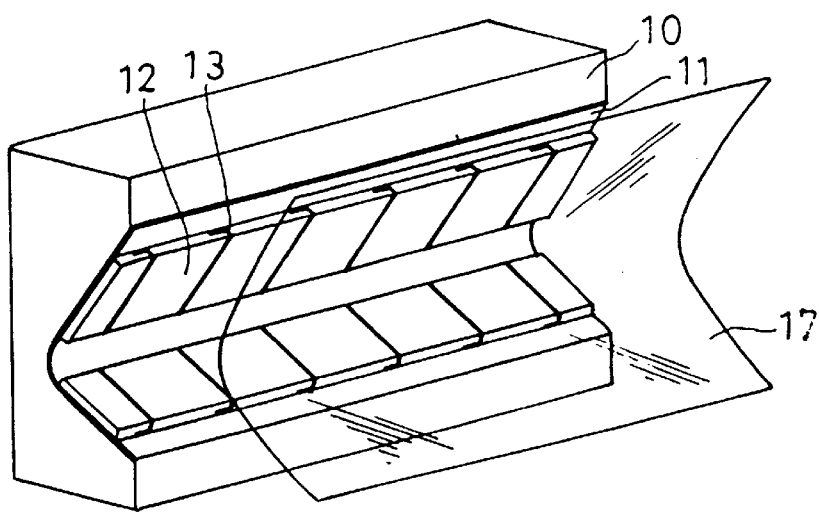

Thereafter, as shown in FIG. 3(C), the rectangular silicone blocks 12 and the rectifying fin prepregs 13 are covered with a vacuum bag 17, which is then evacuated. Air in the prepregs 11, 13 is now removed to press the outer skin prepreg 11 snugly against the outer skin tool die 10, and the contacting surfaces of the prepregs 11, 13 are intimately held against each other. The outer skin tool die 10 with the prepregs 11, 13 and the silicone blocks 12 is placed in an autoclave, and then heated and pressurized according to a predetermined cure-cycle. The outer skin prepreg 11 is cured into the outer wall 1, and the flow-rectifying fin prepregs 13 are cured into the flow-rectifying fins F, with the outer wall 11 and the flow-rectifying fins F being firmly joined to each other by a resin integrally-joined process.

Thereafter, the vacuum bag 17 is removed and the silicone blocks 12 are pulled out, leaving spaces which serve as the hot-air passageways T. When the silicone blocks 12 are pulled, their transverse dimensions are reduced under stresses. Therefore, the silicone blocks 12 can easily be pulled out even without gradients on their surfaces.

The inner wall 2 is formed according to another process which is substantially the same as the process described above. Specifically, an inner skin prepreg, comprising carbon fibers impregnated with a modified bismaleimide resin is set on an inner skin tool die (not shown) and covered with a vacuum bag, which is evacuated, after which the entire assembly is placed in an autoclave, and heated and pressurized. When the inner skin prepreg is cured with heat and pressure, is provides the inner wall 2 having the inner wall panels 2a and the partition 2b.

Figure 5:
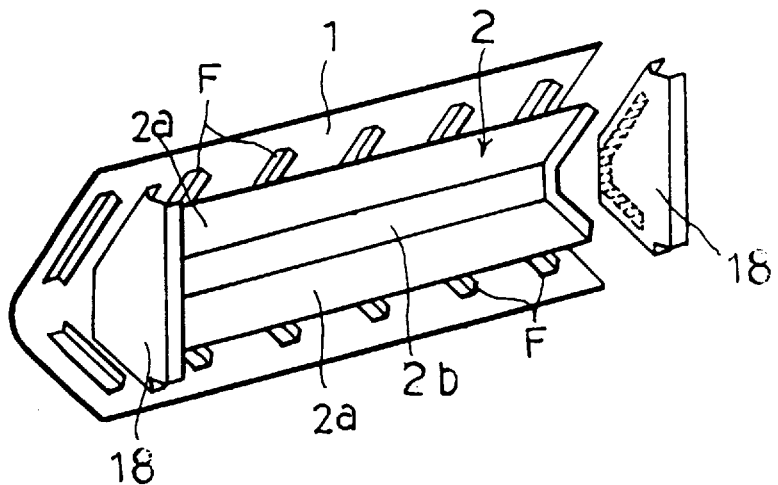
FIG. 5 is a perspective view showing the manner in which an inner wall is bonded in the manufacturing process.
Figure 6:
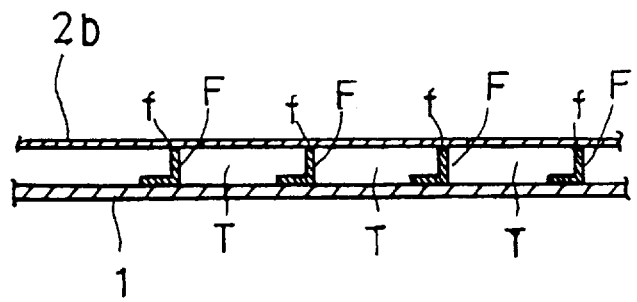
FIG. 6 is a cross-sectional view of an outer wall and an inner wall panel which are joined to each other.

As shown in FIG. 5, the inner wall 2 thus produced is fixed to the outer wall 1. Specifically, opposite ends of the inner wall 2 are fixed to respective ribs 18 by adhesive bonding or the like, and the ribs 18 are then fixed to the outer wall 1 by adhesive bonding or the like, bringing the inner wall panels 2a and the flow-rectifying fins F into intimate contact with each other. Before the inner wall panels 2a are installed against respective tip ends f of the flow-rectifying fins F, as shown in FIG. 6, a sealant is coated on the tip ends f of the flow-rectifying fins F to seal the contacting portions of the inner wall panels 2a and the flow-rectifying fins F when they are brought into intimate contact with each other.

With the leading edge structure thus constructed according to the first embodiment of the present invention, since there is no gap between the inner wall panels 2a and the partition 2b of the inner wall 2, hot air does not leak from the hot-air chamber 4 into the hot-air discharge chamber 6. The inner wall 2 is of a rugged structure because the inner wall panels 2a and the partition 2b are formed as a single component.

Each of the outer and inner walls 1, 2 is made of a composite material including a modified bismaleimide resin for the following reasons. Synthetic resins for use in composite materials which keep satisfactory properties at the high temperature of about 180° C. of bleed air applied thereto are considered to include a modified bismaleimide resin whose curing temperature ranges from 180° to 190° C. and a polyimide resin whose curing temperature ranges from 370° to 400° C. The polyimide resin is available separately from carbon fibers, whereas the modified bismaleimide resin is available in a prepreg state containing carbon fibers. The cost of a facility for processing the modified bismaleimide resin is lower than the cost of a facility for processing the polyimide resin because the curing temperature of the modified bismaleimide resin is lower than the curing temperature of the polyimide resin. However, the materials are not limited to the illustrated materials. The leading edge structure according to the first embodiment is not limited to a main wing, but is also applicable to the leading edge of an engine cowl inlet, the tip end of an engine support arm, the leading edges of horizontal and vertical tailplanes, and the horn balance tip ends of an elevator and a rudder, etc., of an aircraft.

A leading edge structure for an aircraft according to a second embodiment of the present invention will be described below with reference to FIGS. 7 through 12.

Figure 7:
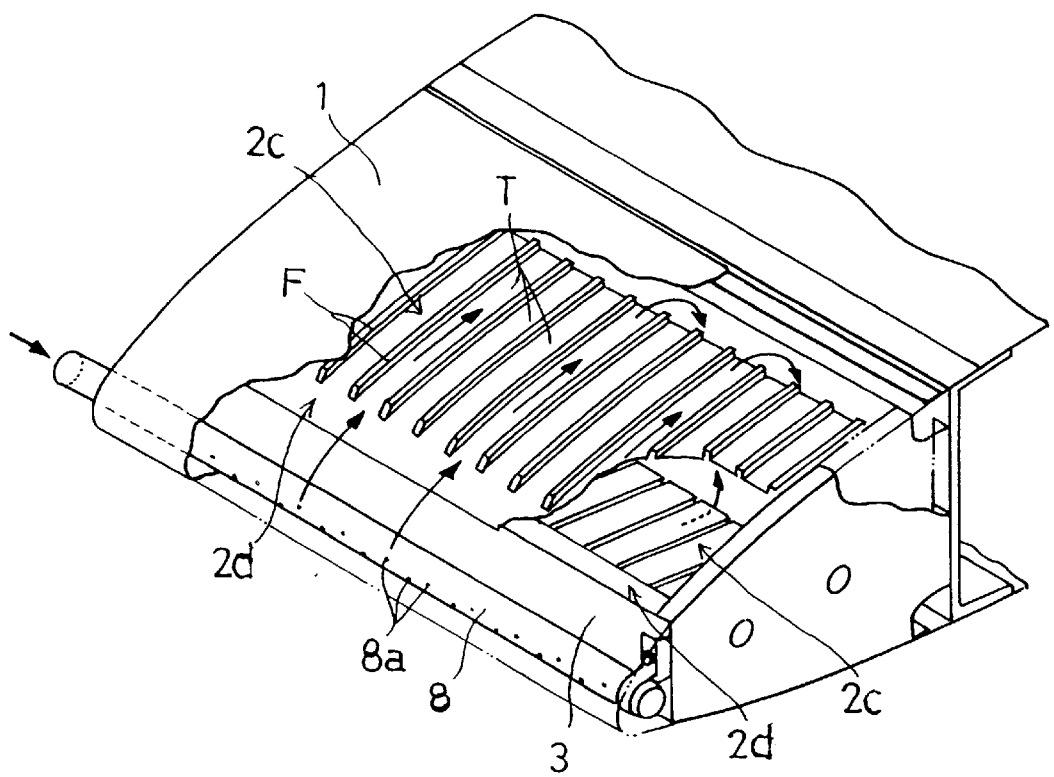
FIG. 7 is a fragmentary perspective view, partly broken away, of a leading edge structure for an aircraft according to a second embodiment of the present invention.
Figure 8:
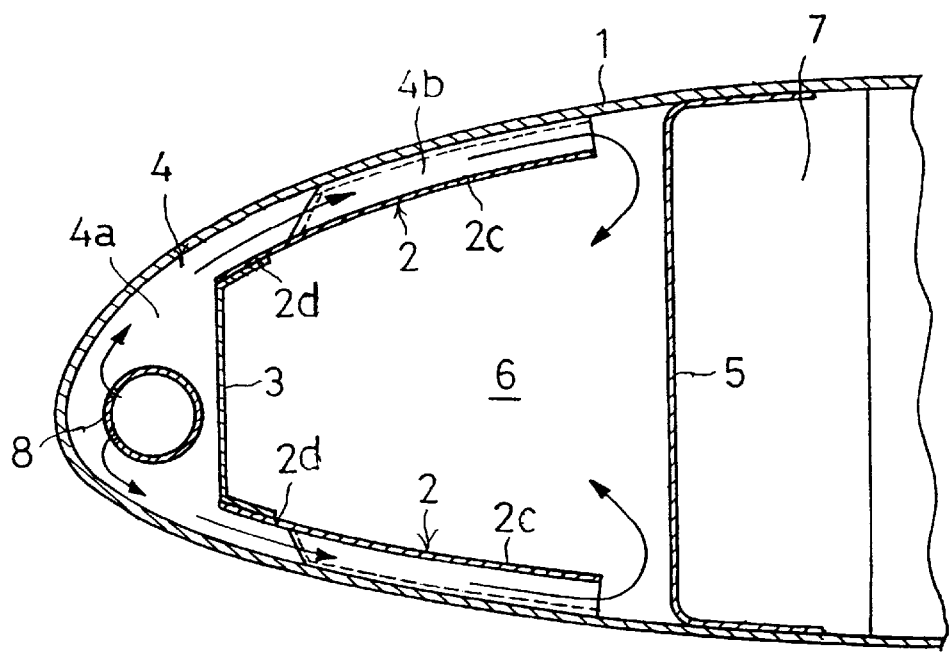
FIG. 8 is a cross-sectional view of the leading edge structure shown in FIG. 7.
Figure 9:
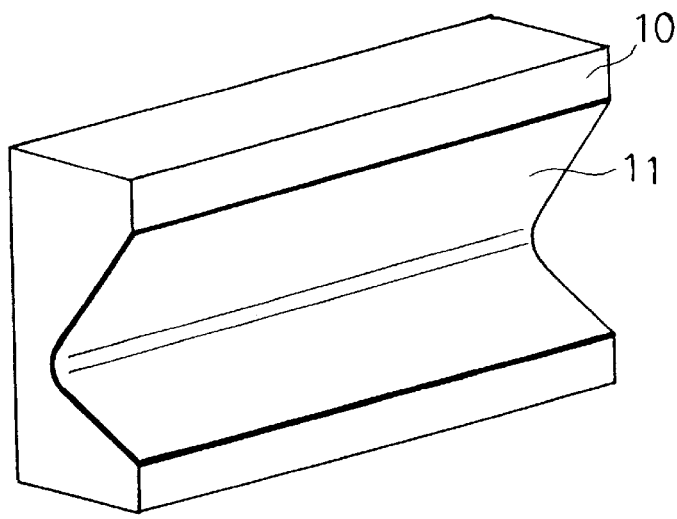
FIGS. 9(A), 9(B), and 9(C) are perspective views illustrative of a process of manufacturing the leading edge structure shown in FIG. 7.
Figure 9:
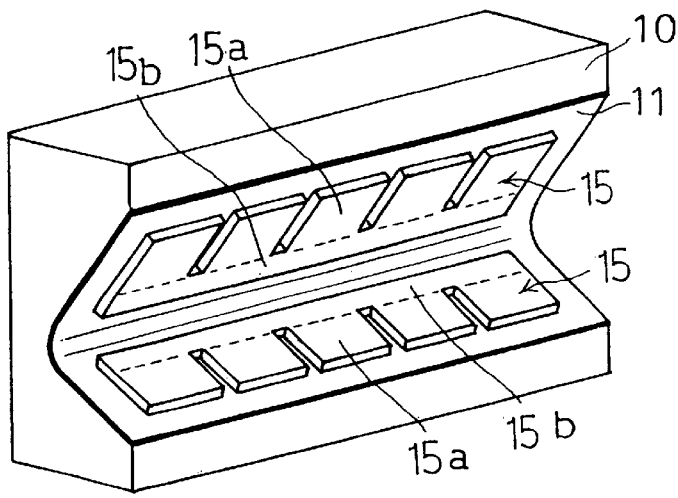
Figure 9:
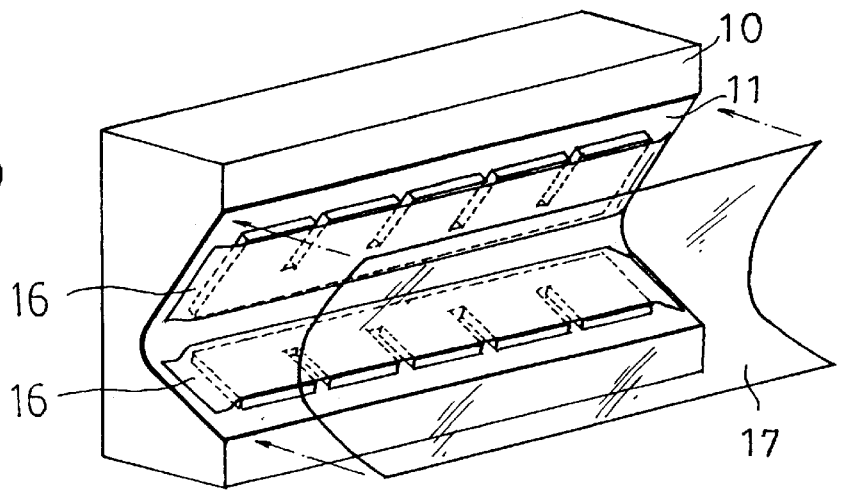
Figure 10:
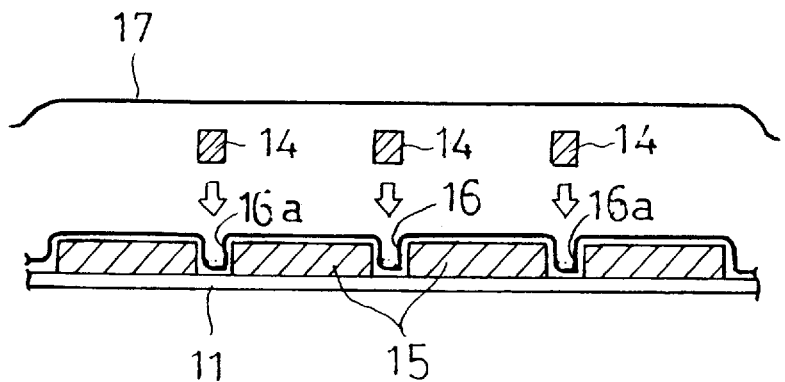
FIG. 10 is a cross-sectional view showing the manner in which an inner wall panel is inserted into tooth grooves of a silicone block in the manufacturing process.

In the leading edge structure for an aircraft according to the second embodiment of the present invention, a leading edge of a main wing of an aircraft is made of a fiber-reinforced synthetic resin which comprises a composite material of a modified bismaleimide resin and carbon fibers. As shown in FIGS. 7 and 8, the leading edge structure comprises an outer wall 1 made of the fiber-reinforced synthetic resin and inner walls 2 and a front partition 3 which are made of the fiber-reinforced synthetic resin and disposed within the outer wall 1 near the leading edge thereof. The outer wall 1, the inner walls 2, and the front partition 3 jointly define a hot-air chamber 4 therebetween. The leading edge structure also includes a rear partition 5 disposed behind the inner walls 2. The inner walls 2, the rear partition 5, and the front partition 3 jointly define a hot-air discharge chamber 6 therebetween. A temperature buffer chamber 7 is defined behind the rear partition 5. External air is introduced into the temperature buffer chamber 7 to prevent an integral tank, etc. housed in a rear portion of the main wing from being excessively heated.

As shown in FIG. 8, the hot-air chamber 4 is divided into a front hot-air ejector 4a positioned forwardly of the front partition 3 and hot-air passages 4b positioned rearwardly of the front partition 3. The hot-air ejector 4a accommodates therein a piccolo tube 8 for passing bleed air therethrough, the piccolo tube 8 having a number of air ejection holes 8a (see FIG. 7). The inner walls 2 comprise respective wall-forming or fin-forming portions 2c with a plurality of flow-rectifying walls or fins F projecting therefrom and respective flat portions 2d spaced a predetermined distance from the outer wall 1. The flow-rectifying fins F are positioned within the hot-air passage 4b at predetermined spaced intervals in the longitudinal direction of the main wing. The flow-rectifying fins F compartmentalize the hot-air passage 4b into a plurality of hot-air passageways T. The front partition 3 is fixed to the flat portions 2d of the inner walls 2 by adhesive bonding.

High-temperature bleed air ejected from the air ejection holes 8a of the piccolo tube 8 flows from the hot-air ejector 4a into the hot-air passageways T of the hot-air passage 4b, and then enters the hot-air discharge chamber 6 from which it is discharged into the atmosphere through discharge ports at wind ends. The high-temperature bleed air thus flowing along the inner surface of the outer wall 1 prevents the outer front surface of the main wing from being iced.

A process of manufacturing the leading edge structure described above will be described below with reference to FIGS. 9(A), 9(B), and 9(C).

First, as shown in FIG. 9(A), an outer skin prepreg 11 in the form of a first laminated sheet of a composite intermediate material comprising carbon fibers impregnated with a modified bismaleimide resin is positioned in an outer skin tool die 10 which is complementary in shape to the leading edge of a main wing. The outer skin prepreg 11 is of a predetermined size, sticky, pliable, and flexible. When the outer skin prepreg 11 is pressed against the outer skin tool die 10, the outer skin prepreg 11 sticks to the a die surface of the outer skin tool die 10 and is shaped complementarily to the die surface of the outer skin tool die 10.

Then, as shown in FIG. 9(B), two silicone blocks 15 of silicone rubber serving as shape retainers are positioned on respective upper and lower slanted surfaces of the outer skin prepreg 11. Each of the silicone blocks 15 is of a comb-toothed shape including a toothed portion 15a and a tooth-free portion 15b. The silicone blocks 15 are pressed against the respective upper and lower slanted surfaces of the outer skin prepreg 11 such that the toothed portion 15a is positioned outwardly and the tooth-free portion 15b inwardly with respect to the outer skin tool die 10. In the illustrated second embodiment, the toothed portion 15a and the tooth-free portion 15b are separated from each other by a broken line on each of the silicone blocks 15.

Thereafter, as shown in FIG. 9(C), two inner skin prepregs 16 each in the form of a second laminated sheet are positioned on the respective silicone blocks 15. Each of the two inner skin prepregs 16 comprises a composite intermediate material each comprising carbon fibers impregnated with a modified bismaleimide resin, and hence is sticky, pliable, and flexible. The two inner skin prepregs 16 have a width identical to or smaller than the silicone blocks 15, and stick to the respective silicone blocks 15 when pressed thereagainst.

When the outer skin prepreg 11, the silicone blocks 15, and the inner skin prepregs 16 are thus stacked, a plurality of silicone blocks 14 which are complementary in shape to the tooth grooves of the silicone blocks 15 are fitted into the respective tooth grooves from above the inner skin prepregs 16, forcing portions of the inner skin prepregs 16 into the tooth grooves. These portions of the inner skin prepregs 16 which are forced into the tooth grooves serve as flow-rectifying fin portions 16a. The entire assembly is covered with a vacuum bag 17, which is then evacuated. Air in the prepregs 11, 16 is now removed to press the outer skin prepreg 11 snugly against the outer skin tool die 10, and the flow-rectifying fin portions 16a and the outer skin prepregs 11 are intimately held against each other.

The outer skin tool die 10 with the prepregs 11, 16 and the silicone blocks 14, 15 is placed in an autoclave, and then heated and pressurized according to a predetermined cure-cycle. The outer skin prepreg 11 is cured into the outer wall 1, and the inner skin prepregs 16 are cured into the inner walls 2. The flow-rectifying fin potions 16a are cured into the flow-rectifying fins F, with the outer wall 1 and the inner walls 2 being integrally joined to each other through the flow-rectifying fins F. The outer wall 1 and the flow-rectifying fins F are firmly joined to each other by a resin integrally joined process.

Thereafter the vacuum bag 17 and, the silicone blocks 14, 15 are removed. Since the toothed portion 15a and the tooth-free portion 15b are separated from each other by the broken line on each of the silicone blocks 15, the toothed portion 15a may be pulled outwardly, and the tooth-free portion 15b may be pulled out inwardly while keeping themselves in their original shape. Since the transverse dimensions of the silicone blocks 15 are reduced when the silicone blocks 15 are pulled, the silicone blocks 15 can easily be pulled out even without gradients on their surfaces.

Figure 11:
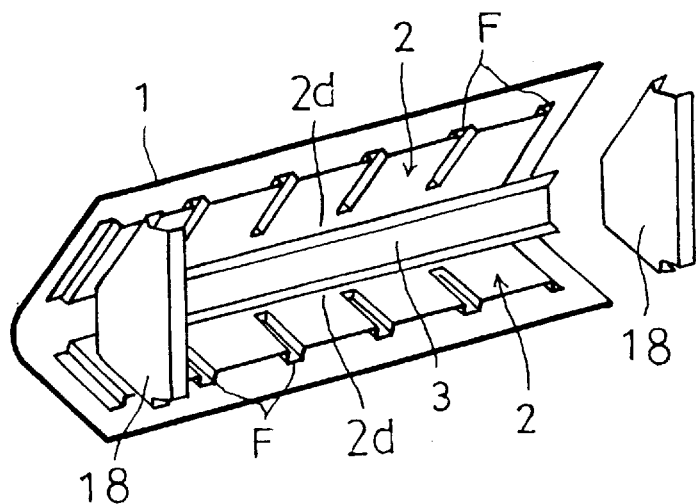
FIG. 11 is a perspective view showing the manner in which a partition is bonded in the manufacturing process.

The spaces from which the silicone blocks 15 are pulled out serve as the hot-air passageways T, and the inner walls 2 have the flat portions 2d in positions corresponding to the tooth-free portions 15b of the silicone blocks 15. As shown in FIG. 11, the front partition 3 is fixed to the flat portions 2d by adhesive bonding or the like. The front partition 3, which has been formed of a composite material and cured in a separate process, is also fixed at opposite ends thereof to ribs 18 which are secured to the inner walls 2. When the front partition 3 is thus fixed to the flat potions 2d, the joined surfaces of the front partition 3 are shaped into simple flat surfaces. Therefore, the front partition 3 can easily be manufactured.

Figure 12:
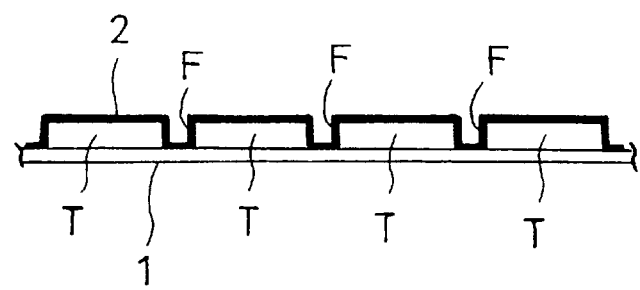
FIG. 12 is a cross-sectional view of an outer wall and an inner wall panel which are joined to each other.

As shown in FIG. 12, the outer wall 1 and the inner walls 2 are firmly joined to each other by the flow-rectifying fins F, providing a double-walled hermetic sealing capability. Since no sealant is required, there is not increase in the weight of the leading edge structure. The leading edge structure according to the second embodiment is also inexpensive to manufacture because no separate die is necessary to form the inner walls 2.

Figure 13:
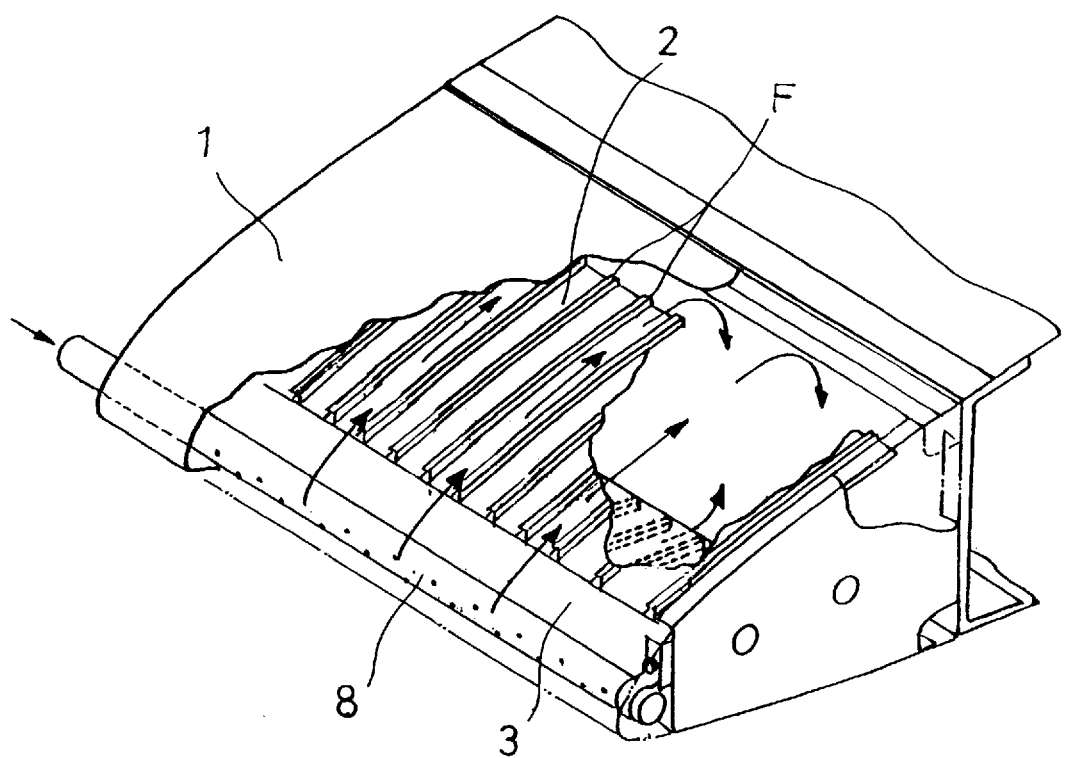
FIG. 13 is a fragmentary perspective view, partly broken away, of a leading edge structure for an aircraft according to a third embodiment of the present invention.
Figure 14:
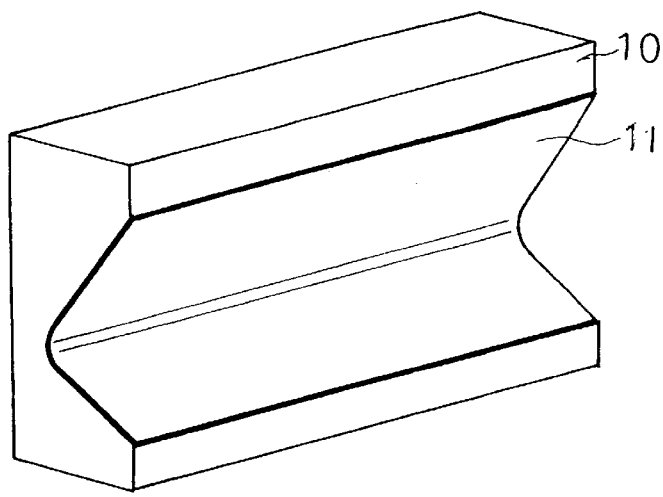
FIGS. 14(A), 14(B), and 14(C) are perspective views illustrative of a process of manufacturing the leading edge structure shown in FIG. 13.
Figure 14:
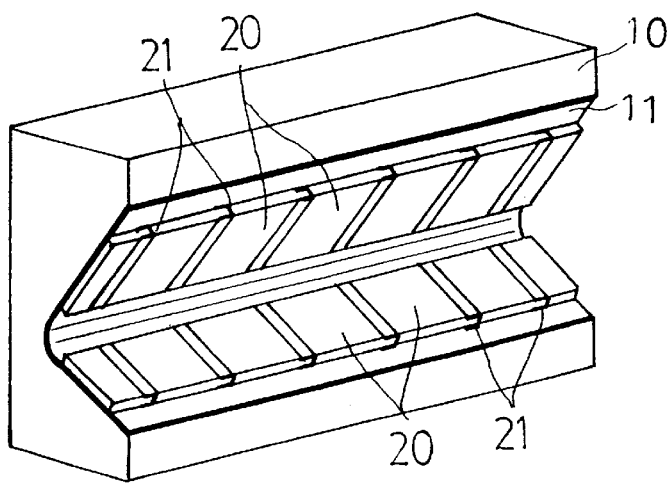
Figure 14:
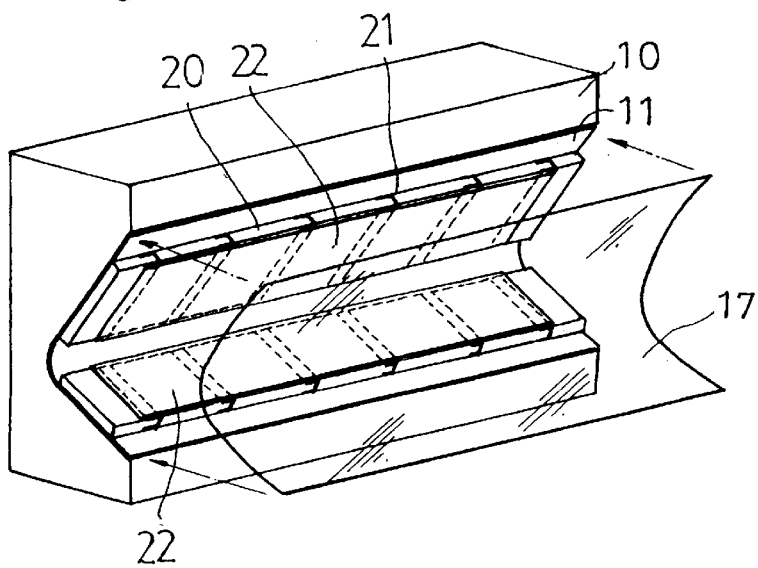

A leading edge structure for an aircraft according to a third embodiment of the present invention will be described below with reference to FIGS. 13 through 17. According to the third embodiment, as shown in FIG.13, an outer wall 1 and inner walls 2 are joined to each other by flow-rectifying walls or fins F of channel-shaped cross section.

The leading edge structure according to the third embodiment is manufactured as follows:

First, as shown in FIG. 14(A), an outer skin prepreg 11 in the form of a first laminated sheet, cut to a predetermined size, of a composite intermediate material comprising carbon fibers impregnated with a modified bismaleimide resin is positioned in an outer skin tool die 10 which is complementary in shape to the leading edge of a main wing. Then, as shown in FIG. 14(B), a plurality of rectangular silicone blocks 20 serving as shape retainers and a plurality of flow-rectifying fin prepregs 21 of channel shaped cross section are successively positioned on upper and lower slanted surfaces of the outer skin prepreg 11. At this time, one flow-rectifying fin prepreg 21 of channel shaped cross section is fitted over a side edge of each of the silicone blocks 20. The silicone blocks 20 with the respective flow-rectifying fin prepregs 21 fitted thereover are placed in two rows on the respective upper and lower slanted surfaces of the outer skin prepreg 11.

Thereafter, as shown in FIG. 14(C), two inner skin prepregs 22 each in the form of a second laminated sheet are positioned on the respective silicone blocks 20. Each of the two inner skin prepregs 22 comprises a composite intermediate material each comprising carbon fibers impregnated with a modified bismaleimide resin, and hence is sticky, pliable, and flexible. The two inner skin prepregs 22 have a width selected not to be larger than the width of the silicone blocks 20, and stick to the respective silicone blocks 20 and the flow-rectifying fin prepregs 21 when pressed thereagainst.

Figure 15:
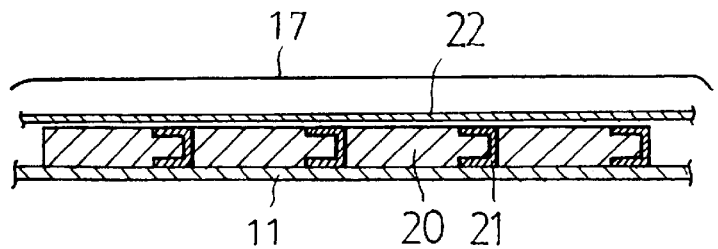
FIG. 15 is a cross-sectional view of an array of prepregs prior to being evacuated in the manufacturing process.

As shown in FIGS. 14(C) and 15, the entire assembly is covered with a vacuum bag 17, which is then evacuated. Air in the prepregs 11, 21, 22 is now removed to cause the contacting surfaces of the outer skin prepreg 11 and the flow-rectifying fin prepregs 21 to be intimately held against each other and also to cause the contacting surfaces of the inner skin prepregs 22 and the flow-rectifying fin prepregs 21 to be intimately held against each other. The outer skin tool die 10 with the prepregs 11, 21, 22 and the silicone blocks 20 is placed in an autoclave, and then heated and pressurized according to a predetermined cure-cycle. The outer skin prepreg 11 is cured into the outer wall 1, and the inner skin prepregs 22 are cured into the inner walls 2. The flow-rectifying fin prepregs 21 are cured into the flow-rectifying fins F. The inner wall 1 and the outer walls 2 are integrally joined to each other by the flow-rectifying fins F. The inner wall 1 and the flow-rectifying fins F are firmly joined to each other by a resin integrally-joined process, and the inner walls 2 and the flow-rectifying fins F are firmly joined to each other by a resin integrally-joined process.

Figure 17:
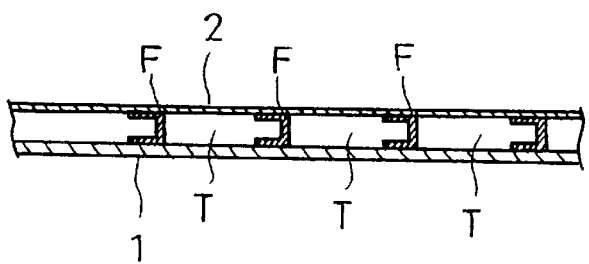
FIG. 17 is a cross-sectional view of an outer wall and an inner wall panel which are joined to each other.

Thereafter the vacuum bag 17 and, the silicone blocks 20 are removed. At this time, when the silicone blocks 20 are pulled outwardly, the transverse dimension thereof is reduced, allowing the silicone blocks 20 to be smoothly pulled out while keeping themselves in their original shape. As shown in FIG. 17, the spaces from which the silicone blocks 22 are pulled out serve as the hot-air passageways T.

Figure 16:
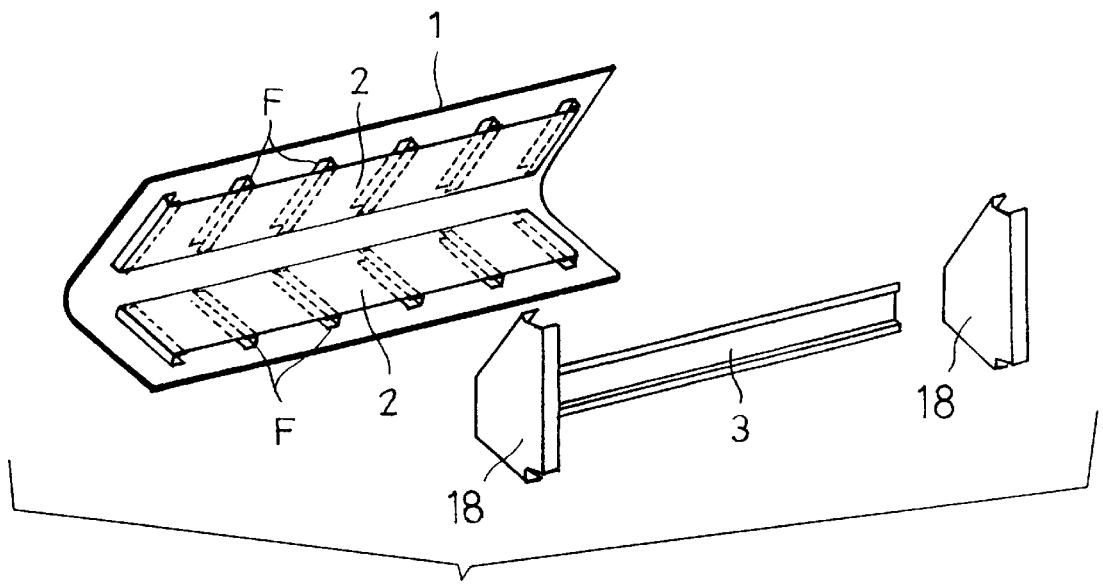
FIG. 16 is a perspective view showing the manner in which a partition is bonded in the manufacturing process.

Thereafter, as shown in FIG. 16, the front partition 3, which has been formed of a composite material in a separate process, is also fixed to the inner walls 2 by adhesive bonding or the like. Opposite ends of the front partition 3 are supported by ribs 18 which are secured to the inner walls 2.

The outer wall 1 and the inner walls 2 are firmly joined to each other by the flow-rectifying fins F, providing a double-walled hermetic sealing capability and increased reliability of the joined portions. Since no sealant is required, there is no increase in the weight of the leading edge structure. The leading edge structure according to the second embodiment is also inexpensive to manufacture as no separate die is necessary to form the inner walls 2.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A method of manufacturing a leading edge structure for an aircraft having an outer wall, an inner wall disposed within said outer wall and including a partition, with said outer wall, said inner wall and said partition jointly defining a hot-air chamber, and a plurality of flow-rectifying fins disposed in said hot-air chamber and compartmentalizing said hot-air chamber into a plurality of hot-air passages, said method comprising the steps of:

positioning a laminated body of an uncured fiber-reinforced synthetic resin on a tool die which is complementary in shape to a leading edge of an aircraft;

positioning a plurality of shape retainers and a plurality of flow-rectifying fin members of an uncured fiber-reinforced synthetic resin having an L-shaped cross section at respective ends of the shape retainers on an inner surface of said laminated body;

covering said shape retainers and said flow-rectifying fin members with a vacuum bag, and evacuating said vacuum bag;

curing the laminated body into the outer wall and the flow-rectifying fin members into the flow-rectifying fins with heat and pressure to join ends of the flow-rectifying fins to the outer wall;

removing said shape retainers to form the hot-air passages; and holding an inner wall and a partition which have been made as a single component of a fiber-reinforced synthetic resin, against other ends of the flow-rectifying fins, and bonding the inner wall and the partition to said outer wall.

2. A method of manufacturing a leading edge structure for an aircraft having an outer wall, an inner wall disposed in said outer wall, a partition joined to said inner wall, with said outer wall, said inner wall and said partition jointly defining a hot-air chamber, and a plurality of flow-rectifying fins disposed in said hot-air chamber and compartmentalizing said hot-air chamber into a plurality of hot-air passages, said method comprising the steps of:

positioning a first laminated body of an uncured fiber-reinforced synthetic resin on a tool die which is complementary in shape to a leading edge of an aircraft;

positioning a comb-toothed shape retainer on an inner surface of said first laminated body;

positioning a second laminated body of an uncured fiber-reinforced synthetic resin on said comb-toothed shape retainer;

inserting a portion of said second laminated body into tooth grooves of the comb-toothed shape retainer, forming the flow-rectifying fins;

covering said second laminated body with a vacuum bag, and evacuating said vacuum bag;

curing said first laminated body into the outer wall and said second laminated body into the inner wall with heat and pressure to join the first laminated body and the second laminated body to each other through the flow-rectifying fins;

removing said shape retainer to form the hot-air passages; and joining the partition to a flat portion of the second laminated body which has been formed by a tooth-free portion of the shape retainer.

3. A method according to claim 2, wherein said comb-toothed shape retainer has a toothed portion, said tooth-free portion being separate from said toothed portion.

4. A method of manufacturing a leading edge structure for an aircraft having an outer wall, an inner wall disposed within said outer wall, a partition joined to said inner wall, with said outer wall, said inner wall and said partition jointly defining a hot-air chamber, and a plurality of flow-rectifying fins disposed in said hot-air chamber and compartmentalizing said hot-air chamber into a plurality of hot-air passages, said method comprising the steps of:

positioning a first laminated body of an uncured fiber-reinforced synthetic resin on a tool die which is complementary in shape to a leading edge of an aircraft;

positioning a plurality of shape retainers on an inner surface of said first laminated body;

positioning a plurality of flow-rectifying fins of an uncured fiber-reinforced synthetic resin having a channel-shaped cross section which are fitted over ends of the respective shape retainers;

positioning a second laminated body of an uncured fiber-reinforced synthetic resin on said shaped retainers;

covering said second laminated body with a vacuum bag, and evacuating said vacuum bag;

curing said first laminated body into the outer wall and said second a laminated body into the inner wall with heat and pressure to join the first laminated body and the second laminated body to each other through the flow-rectifying fins;

removing said shape retainers to form the hot-air passages; and joining the partition to said second laminated body.

5. A method according to claim 1, 2, 3, or 4, wherein said shape retainers are made of silicone rubber.

6. A method of manufacturing a leading edge structure for an aircraft having an outer wall, an inner wall disposed within said outer wall and including a partition, with said outer wall, said inner wall and said partition jointly defining a hot-air chamber, and a plurality of flow-rectifying fins disposed in said hot-air chamber and compartmentalizing said hot-air chamber into a plurality of hot-air passages, said method comprising the steps of:

positioning a laminated body of an uncured fiber-reinforced synthetic resin on a tool die which is complementary in shape to a leading edge of an aircraft;

forming an inner wall and a partition of an uncured fiber-reinforced synthetic resin;

positioning a plurality of shape retainers on an inner surface of said laminated body with a flow-rectifying fin member of an uncured fiber-reinforced synthetic resin between each adjacent pair of the shape retainers;

the inner wall and partition being in spaced relation to the outer wall with said flow-rectifying fin members being between the outer wall and inner wall;

the outer wall, inner wall, partition and flow-rectifying fins being cured;

the flow-rectifying fin members being joined to both the outer wall and the inner wall by at least one of curing, adhesive bonding or being integrally formed; and removing said shape retainers to form the hot-air passages.

7. A method according to claim 6, wherein said shape retainers are made of silicone rubber.

* * * * *